United States Patent [19]

Kramer

[11] Patent Number: 4,918,994
[45] Date of Patent: Apr. 24, 1990

[54] GAS METER

[75] Inventor: Albert Kramer, De Bilt, Netherlands

[73] Assignee: EMS Holland B.V., De Bilt, Netherlands

[21] Appl. No.: 279,549

[22] Filed: Dec. 2, 1988

Related U.S. Application Data

[63] Continuation-in-part of Ser. No. 52,792, May 21, 1987, abandoned.

[51] Int. Cl.$^5$ ............................................. G01F 1/40
[52] U.S. Cl. ............................................. 73/861.53
[58] Field of Search ............... 73/861.53, 861.58, 198, 73/861.52, 861.62, 199, 195; 137/487.5, 599

[56] References Cited

U.S. PATENT DOCUMENTS

| | | | |
|---|---|---|---|
| 2,627,280 | 2/1953 | Adelson | 137/599 X |
| 3,428,079 | 2/1969 | Wylupek | 137/186 |
| 3,875,955 | 4/1975 | Gallatin et al. | 137/487.5 X |

FOREIGN PATENT DOCUMENTS

| | | |
|---|---|---|
| 0061856 | 10/1982 | European Pat. Off. . |
| 86259 | 6/1985 | European Pat. Off. . |
| 1648059 | 12/1971 | Fed. Rep. of Germany . |
| 3417604 | 9/1985 | Fed. Rep. of Germany . |
| 92313 | 5/1984 | Japan . |
| 2026704 | 2/1980 | United Kingdom . |

OTHER PUBLICATIONS

Research Disclosure, No. 228, Apr. '83, No. 22,804, Havant, Hampshire, G.B., Flowmeter.

Primary Examiner—Jerry W. Myracle
Attorney, Agent, or Firm—Rosen, Dainow & Jacobs

[57] ABSTRACT

Method and device for measuring a quantity of gas flowing through a pipe (1) provided with an adjustable restriction (3) having a number of selectable different restriction areas (A), each having associated therewith a pair of an upper limit pressure difference and a lower limit pressure difference said pair of limits providing a range of measurable values of pressure difference, comprising measurement of the pressure difference (dP) over the restriction (3), selecting a larger or smaller restriction area (A) when the measured pressure difference is greater or smaller respectively than the upper limit pressure difference or lower limit pressure difference respectively of the presently selected restriction area, and determining the quantity (Q) of gas by computing the product of the actual pressure difference (dP) and a factor depending on the presently selected restriction area (A).

15 Claims, 2 Drawing Sheets

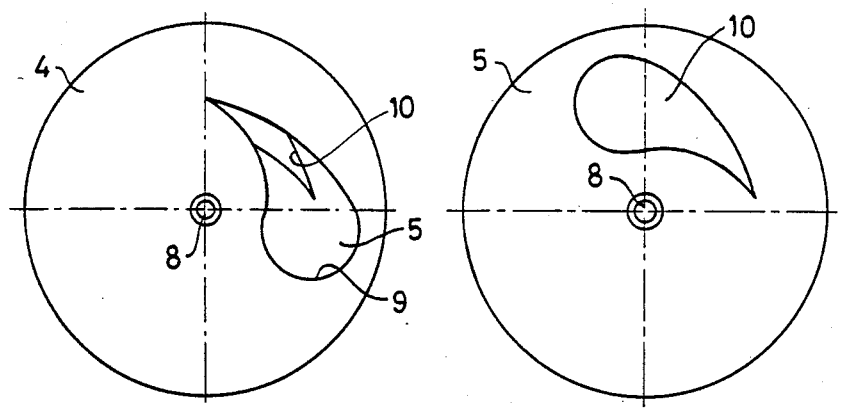
Fig: 3a.    Fig: 3b.
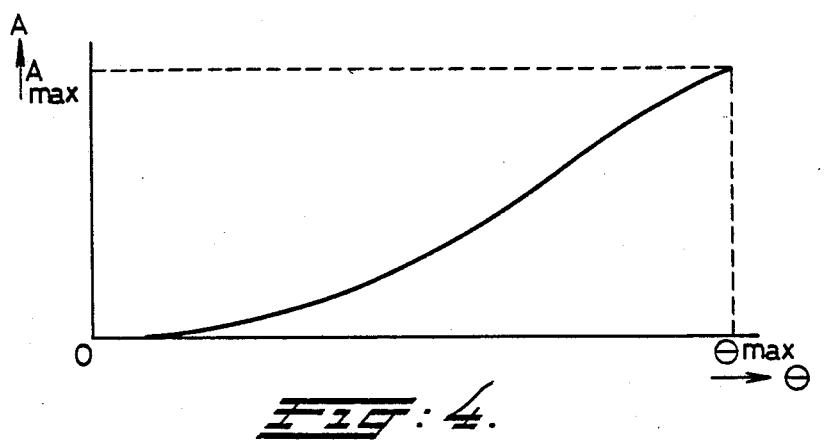
Fig: 4.
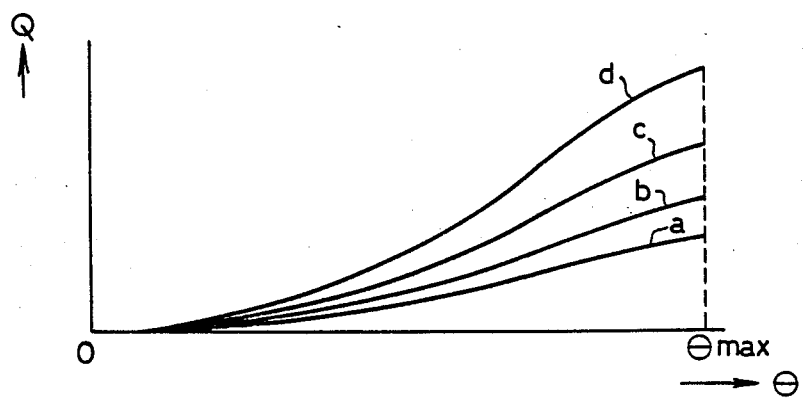
Fig: 5.

GAS METER

This application is a continuation-in-part of application Ser. No. 052,792 filed on 5/21/87, now abandoned.

The invention relates to a method for measuring a quantity of gas flowing per unit time through a pipe provided with an adjustable restriction having a number of selectable different restriction areas, comprising measurement of the pressure difference over the restriction, selecting a larger or smaller restriction area depending on an increase or decrease respectively of the pressure difference, and determining the quantity of gas dependent on the selected restriction area A method of this type is known from U.S. Pat. No. 3,875,955 (Gallatin).

In the known method the restriction area is constantly increased or reduced in such a way that the pressure difference measured over the restriction is essentially constant. The set restriction area constitutes a measure for the quantity of gas. Since, due to various delays occurring in the control circuit for the restriction area, the adjustment of the restriction area does not take place at the same time as that at which the pressure difference is measured, during the adjustment the restriction area will not constitute an accurate measure for the quantity of gas flowing through the pipe. The inaccuracy of the measurement of the quantity of gas is then undesirably high in particular when relative to the delays there are rapidly occurring changes in the quantity of gas flowing through the pipe and/or small quantities of gas flowing through the pipe. This inaccuracy is further increased through the fact that the restriction area is increased or reduced stepwise, and in order to keep the pressure difference as constant as possible, it is necessary to have a large number of individually adjustable valves, which upset the flow behaviour of the gas depending on whether or not the various valves are open or closed, so that the pressure difference is difficult to keep dynamically constant.

The object of the invention is to eliminate the disadvantages of the known method.

The method of the type mentioned in the preamble is therefore according to the invention characterized in that with each restriction area there is associated a pair of an upper limit pressure difference and a lower limit pressure difference, said pair of limits providing a range of measurable values of pressure differences, the quantity of gas is determined dependent on the product of a pressure difference actually measured and a factor depending on the selected restriction area, and a larger or smaller restriction area is selected when the measured pressure difference is larger or smaller respectively than the upper limit pressure difference or lower limit pressure difference respectively of the currently selected restriction area. This means that the quantity of gas flowing through the pipe is determined by the current restriction area and the current pressure difference, so that relatively high accuracy in determining the quantity of gas is obtained and the process can be used for measuring relatively rapidly changing quantities of gas and/or small quantities of gas. Since each selectable restriction area corresponds to a range of measurable pressure differences the number of restriction areas can be small, so that the frequency of selecting a different restriction area is made relatively small providing a smoother measuring process while retaining a rapid response to changes in the quantity of gas and the measuring accuracy thereof.

Preferably with a decreasing quantity of gas a progressively smaller restriction area is selected. In this way the accuracy for small quantities of gas is increased.

Preferably the lower limit pressure difference associated with a restriction area is made to correspond to a smaller quantity of gas than a quantity of gas which is made to correspond to the upper limit pressure difference associated with an immediately preceding smaller restriction area. Thereby the occurrence of resonance phenomena when selecting other restriction areas is prevented.

The invention also relates to a gas meter according to claims 4 to 12 inclusive in which the process according to the invention is used.

The invention is explained with reference to the drawings. In the drawings:

FIG. 3a shows a front view of the restriction discs used in the gas meter of FIG. 1;

FIG. 3b shows a front view of a central disc of the discs shown in FIG. 3a;

Figure 1:
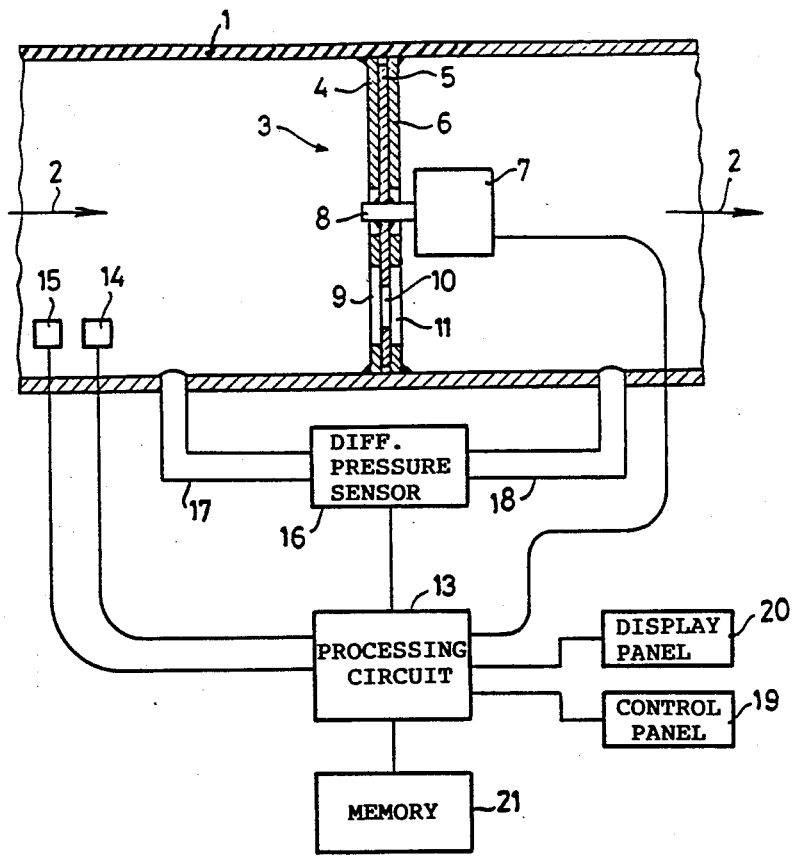
FIG. 1 shows schematically and partially in cross section an embodiment of a gas meter in which the process according to the invention is used.

FIG. 4 shows a graph, illustrating the operation of the gas meter shown in FIG. 1, of the restriction area as a function of the relative angle of rotation of the restriction discs shown in FIG. 3a; and FIG. 5 shows a graph, illustrating the gas meter shown in FIG. 1, of the quantity of gas flowing through the pipe of the meter as a function of the relative angle of rotation of the restriction discs shown in FIGS. 3a and 3b for various values of the pressure difference over the restriction.

FIG. 1 shows a gas meter according to the invention which is suitable for application of the process according to the invention.

The gas meter comprises a pipe 1 through which gas can flow in the direction indicated by the arrows 2. The pipe 1 has a restriction 3 which is formed by three discs 4, 5 and 6 which are disposed against each other and at right angles to the flow of gas in the pipe 1, the discs 4 and 6 which rest in sealing fashion against the inside wall of the pipe 1, and the disc 5 which is rotatable between the discs 4 and 6 by means of a stepping motor 7, which is disposed in the pipe 1 in such a way (not shown) that it does not rotate, and a shaft 8 of which is connected to the centre of the disc 5. The discs 4, 5 and 6 each have a passage 9, 10 and 11 respectively, the passages 9 and 11 of which are disposed opposite each other, while through suitable control of the stepping motor 7 the passage 10 can be turned more or less opposite the passages 9 and 11, so the area, which will also be called restriction area below, of the common passage of the discs, 5 and 6 can be set for the gas. For this, the stepping motor 7 is connected to a processing circuit 13, which is also connected to an absolute temperature sensor 14 disposed in the pipe 1, an absolute pressure sensor 15 disposed in the pipe 1, a pressure difference meter 16, which is connected by means of pipes 17 and 18 to the spaces on either side of the restriction 3, a control panel 19, a display panel 20, and a memory 21.

Figure 2:
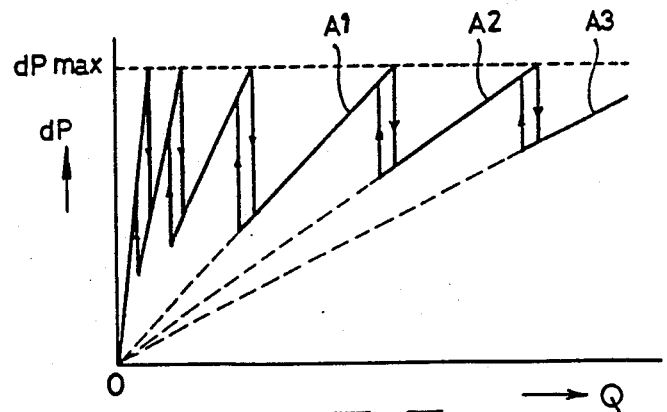
FIG. 2 shows a graph, illustrating the operation of the gas meter shown in FIG. 1, of the pressure difference over a restriction in a pipe as a function of a quantity of gas flowing through the pipe, and a quantity of gas flowing through the pipe, and depending on the restriction area.

As can be seen from the graph shown in FIG. 2 by way of example, the pressure difference dP measured by the pressure difference meter 16 is zero when the gas is at a standstill in the pipe 1 and the quantity Q of gas flowing through the pipe 1 per unit time is thus zero. At a particular restriction surface the pressure difference will change in approximately linear fashion as a function of the quantity Q of gas flowing through the pipe 1. This applies to each of the areas which can be set for the restriction 3. In FIG. 2 the line parts indicated by A1, A2 and A3 correspond to respective increasing restriction areas. With a particular restriction area it is therefore the case that the quantity 1Q of gas flowing through the pipe 1 is approximately equal to the product of the pressure difference dP and the selected restriction surface Ai, thus:

$$Q = dP \times Ai \qquad (1)$$

The quantity must, however, be adjusted for the absolute temperature Ta in the pipe 1, the absolute pressure Pa in the pipe 1, and the properties of the gas, so that:

$$Q = dP \times k \qquad (2)$$

in which k is a function of Ai, Ta, Pa and the gas properties.

It is also desirable to refer the quantity of gas measured per unit time to a standard quantity for a standard temperature Tn and a standard pressure Pn, so that:

$$Q = dP \times Pa/Ta \times Kn \qquad (3)$$

in which Kn is a function of k and Tn and Pn.

In accordance with the formula (3) given above, the quantity of gas flowing through the pipe 1 per unit time is thus determined depending on the current pressure difference dP.

If, as shown in FIG. 2, the pressure difference dP for a selected restriction surface rises above a certain value, in FIG. 2 chosen equal to dP max. for all restriction surfaces, the processing circuit 13 through appropriate control of the stepping motor 7 selects a greater restriction area, and the processing circuit 13 selects a smaller restriction area when the pressure difference falls below a minimum pressure difference appertaining to the current restriction area. The transition for the choice between two different restriction surfaces has a hysteresis, as shown in FIG. 2 by the vertical lines provided with arrows. This counteracts oscillation of the measurement.

According to the invention, various values of the pressure difference dP can be measured for a selected restriction area, so that each point of each slanting line part in FIG. 2 represents a value of the pressure difference dP to be measured, so that the gas quantity Q can always be calculated accurately and dynamically with the aid of the current dP.

FIG. 3a shows a front view of the packet of discs 4, 5 and 6. The disc 6 is of the same design and has the same orientation as the disc 4, so that the disc 6 is not visible in FIG. 3a. The passages 9, 10 and 11 are congruent and are preferably of a shape which resembles a side view of a disintegrating droplet curved round the central area of the discs, the passages 9 and 11 are running in the same direction and aligned relative to each other, while the passage 10 runs in the opposite direction to that of the passages 9 and 11. FIG. 3b is a front view of the aperture 10 in disc 5, separated from the assembly, assuming the disc 5 is positioned as shown in FIG. 3a. As shown in FIG. 4, this means that with a decreasing angle of rotation $\theta$ of the rotary disc 5 the restriction area A decreases progressively, so that a small restriction area can be set relatively more accurately than a larger restriction area.

FIG. 5 shows the quantity Q of gas flowing through the pipe 1 as a function of the angle $\theta$ of the rotary disc 5 for several values of the pressure difference dP. FIG. 5 shows four isocurves a, b, c, d for various pressure differences dP. The pressure difference represented by the curve d is double the pressure difference represented by the curve c, which is double the pressure difference represented by the by the curve a. It can be seen from FIG. 5 that, due to the special design of the discs 4, 5 and 6 shown in FIG. 3a and 3b, the quantity of gas Q flowing per unit time through the pipe 1 can be measured with better absolute accuracy for smaller quantities.

The memory 21 is suitable for storage therein of a program with which the process according to the invention is carried out, constants such as Tn, Pn, values of gas properties, measured pressure values, measured temperature values, and the total quantity of gas V which has flowed through the pipe 1, which is determined by integration in time of the quantity Q of gas which has flowed through the pipe 1 per unit time. The memory 21 is also suitable for storing a calibration table drawn up after the production of the meter and used for correcting the gas quantity determined.

By means of the control panel 19, the content of the memory 21 can be input fully or partially via the processing circuit 13 or can be displayed therefrom on the display panel 20. The data present in the memory 21 can also be output via an output of the processing circuit 13 not shown.

Through use of the discs 4, 5 and 6 shown in FIG. 3a and 3b for the restriction, and by taking into account the pressure difference dP when determining the quantity Q of gas flowing through the pipe 1, a large measuring range for the gas quantity, for both large and small quantities and great accuracy and a rapid response are obtained. As a result of the rapid response, measurements can be made more frequently, so that the total gas quantity measured within a relatively long period can be measured with corresponding accuracy.

A different, more extensive, representation of the calculations to be made is as follows. The symbols used are:

Dp = pressure difference over valve (restriction).
Pa = absolute pressure of medium.
Ta = absolute temperature of medium.
Vol = the amount of medium passed in a certain time.
K1 . . . n = valve-position constants for positions 1 through n.
Q = amount of flow of medium through valve.
Qn = idem in respect to 273.15 K and 1013.33 mbar.
Exp = exponent between 0.5 and 1, depending on the shapes of the valve.
Rho = density of medium, compensated for Pa and Ta.
Rgas = a density constant of a certain medium (gasses).
v = velocity of the medium in the valve.
C = constante depending on Kn.
t = time passed between two calculations of Vol.

The velocity of the medium inside the valve is:

$$v = C \times (2 \times Rho \times Dp)^{Exp}$$

With: $Rho = Rgas \times (Pa/Ta)$
The flow Q is:

$$Q = Kn \times v$$

To normalize the flow, we use the wellknown formula:

$$Qn = Q \times \frac{Pa}{Pn} \times \frac{Tn}{Ta}$$

With: $Pn = 1013.33$ mbar and $Tn = 273.15$ K.
The passed amount of medium is then:

$$Vol = Qn \times t$$

Thus the complete formula is:

$$Vol = Kn \times C \times (2 \times Rho \times Dp)^{Exp} \times t \times \frac{Pa \times Tn}{Pn \times Ta}$$

The total delivered volume of medium is:

$$Vol(new) = Vol(old) + Vol$$

From the above formula it will be apparent that the calculation of the volume is dependent on the characteristics of the gas actually to be measured and several constants. Therefore the positions of the valve and thus the restriction areas to be selected with associated upper and lower limits of the pressure difference ranges will be defined during calibration of the gas meter for the actual circumstances.

The first position of the valve has a lower limit of zero for both flow and pressure. The upper pressure limit is equal for all positions. The lower pressure limit is higher for higher flow-ranges. This is because of the exponent in the formula for the flow, which causes less accuracy with lower pressure. So it is important to increase the lower pressure limit with increasing flow.

Also a certain hysteresis is necessary to prevent the valve to oscillate between two positions. There are two ways to establish this hysteresis: by pressure or by flow. The hysteresis is only calculated when the position has to be decreased. Increasing the position happens always when the pressure difference exceeds the upper limit.

I claim:

1. A method for measuring a quantity of gas flowing per unit time through a pipe provided with an adjustable restriction having a plurality of selectable different restriction areas and having means for measuring the pressure difference across the restriction, comprising the steps:
   (a) establishing for each selectable different restriction area a range of measurable pressure differences, each range having upper and lower pressure difference limits,
   (b) measuring the pressure difference across a selected restriction,
   (c) if the measurement difference is larger than the upper limit for the currently selected restriction, selecting the next restriction whose area is larger than that of the currently-selected restriction, if the measured pressure difference is smaller than the lower limit for the currently-selected restriction, selecting a preceding restriction whose area is smaller than that of the currently-selected restriction,
   (d) measuring the actual pressure difference across the last-selected restriction,
   (e) determining the quantity per unit time of flowing gas by multiplying the actual pressure difference measured in step (d) by a factor determined by the last-selected restriction area.

2. The method of claim 1, wherein the selectable restriction areas are discrete, each restriction area covering a different range of flowing gas quantities to be measured.

3. The method of claim 2, wherein the flowing gas measurable ranges decrease in value with decreasing flowing gas quantities.

4. The method of claim 2, wherein adjacent flowing gas measurable ranges overlap at their pressure difference limits.

5. The method of claim 2, wherein the ranges of measurable pressure differences increase in value with decreasing flowing gas quantities.

6. The method of claim 1, wherein the selecting of step (c) is carried out by stepping to the next or to the preceding restriction.

7. A gas meter comprising: a pipe, an adjustable restriction in the pipe for allowing through a gas flow, said restriction being adjustable to form a number of different restriction areas, a pressure sensor for measuring the pressure difference across the restriction, means connected to the restriction for selecting a different restriction area, means for storing for each selectable restriction area a range of pressure difference having an upper limit and a lower limit, control means connected to the pressure sensor and the restriction selecting means, said control means being operable in response to the measured pressure difference being greater than the stored upper limit of the pressure difference range for the currently-selected restriction area to actuate the restriction selecting means to select the next larger restriction area and in response to the measured pressure difference being smaller than the stored lower limit of the pressure difference range for the currently-selected restriction area to actuate the restriction selecting means to select the preceding smaller restriction area, and computation means connected to the pressure sensor for computing the quantity of gas flowing per unit time through the pipe by computing the product of the actual measured pressure difference value and a factor depending on the last-selected restriction area.

8. The gas meter of claim 7, wherein the stored pressure difference ranges are progressively larger for smaller restriction areas.

9. The gas meter of claim 7, wherein each selectable restriction area is related to a difference range of gas flow rates, and the gas low ranges of adjacent restriction areas overlap at their limits.

10. The gas meter according to claim 7, wherein the adjustable restriction comprises two, adjacent, relatively rotatable discs disposed in the pipe essentially at right angles to the gas flow path, said restriction selecting means comprises disc driving means connected to one of the discs and to the control means, each discs having a passage such that the passages when overlapping to different degrees form the different restriction areas, the driving means in response to a control signal received from the control means being operable to rotate said one disc over the other disc to change the restriction area.

11. The gas meter according to claim 10, wherein the adjustable restriction comprises a third, outer, disc adjacent the other discs and having a passage corresponding to the passage of the other outer disc, said one disc being rotatable relative to the third disc.

12. The gas meter according to claim 10, wherein the passages of the discs are of such shape that with decreasing relative angle of rotation of the discs the restriction area decreases more slowly from the largest area to the smallest area.

13. The gas meter according to claim 10, wherein each passage is essentially the shape of a side view of a disintegrating droplet curved round the central area of the disc in question, the shape of the passage of said one disc having an orientation opposite to that of said other disc.

14. The gas meter according to claim 10, wherein each disc has a number of similar passages, each passage corresponding to only one passage of another disc when rotating the discs with respect to each other.

15. The gas meter according to claim 10, wherein the driving means comprises a stepping motor.

* * * * *